United States Patent
Song

(10) Patent No.: US 10,336,624 B2
(45) Date of Patent: Jul. 2, 2019

(54) METHOD OF PRODUCING HIGH-PLURALITY LITHIUM CARBONATE BY CONTROLLING PARTICLE SIZE, PARTICLE SIZE DISTRIBUTION, AND PARTICLE SHAPE

(71) Applicant: KANGWON NATIONAL UNIVERSITY University-Industry Cooperation Foundation, Gangwon-do (KR)

(72) Inventor: Young Jun Song, Gangwon-do (KR)

(73) Assignee: KANGWON NATIONAL UNIVERSITY University-Industry Cooperation Foundation, Gangwon-do (KR)

(*) Notice: Subject to any disclaimer, the term of this patent is extended or adjusted under 35 U.S.C. 154(b) by 0 days.

(21) Appl. No.: 15/991,590

(22) Filed: May 29, 2018

(65) Prior Publication Data
US 2019/0144295 A1 May 16, 2019

(30) Foreign Application Priority Data
Nov. 14, 2017 (KR) .................. 10-2017-0151354

(51) Int. Cl.
*C01D 15/00* (2006.01)
*C01D 15/08* (2006.01)
*C01F 11/46* (2006.01)
(52) U.S. Cl.
CPC ............ *C01D 15/08* (2013.01); *C01F 11/462* (2013.01); *C01P 2004/03* (2013.01); *C01P 2006/80* (2013.01)

(58) Field of Classification Search
CPC .................. C01D 15/08; C01F 11/462
(Continued)

(56) References Cited

U.S. PATENT DOCUMENTS 6,207,126 B1* 3/2001 Boryta ............... C01D 15/04
423/158
2012/0189516 A1* 7/2012 Donaldson ............ C01D 3/08
423/179.5

FOREIGN PATENT DOCUMENTS

JP 2009-046390 A 3/2009
KR 10-2010-0074105 A 7/2010
(Continued)

*Primary Examiner* — Steven J Bos
(74) *Attorney, Agent, or Firm* — Harness, Dickey & Pierce, P.L.C.

(57) ABSTRACT

Disclosed is a method of producing high-purity lithium carbonate from low-purity crude lithium carbonate. The method includes: (a) producing crude lithium carbonate slurry by mixing crude lithium carbonate having a polycrystalline state and a size of 20 to 200 μm with water; (b) carbonating and dissolving the crude lithium carbonate slurry; (c) performing primary solid-liquid separation to obtain a filtrate; (d) adding soluble barium salts to the filtrate to deposit barium sulfate; (e) performing secondary solid-liquid separation for the filtrate containing the deposited barium sulfate to obtain a filtrate; (f) mixing lithium carbonate seed crystals with the filtrate obtained from the secondary solid-liquid separation and precipitating lithium carbonate dissolved in the filtrate on surfaces of the lithium carbonate seed crystals to produce high-purity lithium carbonate slurry containing high-purity lithium carbonate by controlling a particle size; and (g) carbonating the high-purity lithium carbonate slurry to produce high-purity lithium carbonate.

13 Claims, 4 Drawing Sheets

(58) Field of Classification Search
USPC .............................. 423/179.5, 421, 166, 554
See application file for complete search history.

(56) References Cited

FOREIGN PATENT DOCUMENTS

| | | | |
|---|---|---|---|
| KR | 10-1604954 | B1 | 3/2016 |
| KR | 10-1773439 | B1 | 9/2017 |

* cited by examiner

METHOD OF PRODUCING HIGH-PLURALITY LITHIUM CARBONATE BY CONTROLLING PARTICLE SIZE, PARTICLE SIZE DISTRIBUTION, AND PARTICLE SHAPE

CROSS REFERENCES TO RELATED APPLICATIONS

The present application claims priority to Korean Patent Application No. 10-2017-0151354, filed in the Korean Patent Office on Nov. 14, 2017, the entire contents of which are incorporated herein by reference.

FIELD

The present invention relates to a method of producing high-purity lithium carbonate by controlling a particle size, a particle size distribution, and a particle shape.

BACKGROUND

South Korea is known as a nation capable of producing a mass amount of lithium secondary batteries, and occupies 40% of the worldwide production capacity of the cathode active materials for secondary batteries. Therefore, South Korea imports about 15,000 tons of lithium carbonate to produce the cathode active materials. A process of recycling discarded lithium secondary batteries is classified into a dry process and a wet process. In the dry process, discarded lithium secondary batteries are introduced into a high-temperature furnace to recover metals, which is relatively simple. However, the dry process is expensive in terms of initial investment cost. In addition, a metal recovery rate is poor, and gas treatment cost is high disadvantageously. In comparison, in the wet process, discarded lithium secondary batteries are dissolved in sulfuric acid, and metals are extracted using a solvent extraction method. The wet process is advantageous in terms of an inexpensive initial cost, a high metal recovery rate, and a high purity. However, a cost for treating a waste liquid of the solvent extraction is expensive disadvantageously.

In South Korea, the amount of discarded lithium secondary batteries is estimated to about 20,000 tons per year. Out of this amount, it is known that about 3,000 tons of metal scraps are generated in the process of recovering metals from the discarded lithium secondary batteries. The process of recovering metals from discarded lithium secondary batteries is mainly a solvent extraction process for recovering cobalt and nickel from discarded cathode active materials. Through the solvent extraction process, a manganese sulfate waste liquid and a lithium sulfate waste liquid are generated abundantly. Since the manganese sulfate waste liquid and the lithium sulfate waste liquid are heavy metals, an unfiltered discharge to the nature is inhibited. In this regard, a purification process or a strategy for extracting useful metals from the waste liquid has been studied in the art.

An annual metal recovery capacity of the main domestic discarded lithium secondary battery recycling companies is estimated to 12,000 tons per year. Assuming that the factories are fully operated, 12,000 tons of the manganese sulfate waste liquids and 180,000 tons of lithium sulfate waste liquids are generated. It is predicted that the metal recovery facilities will be established more and more, and the waste liquid amount also increases in the future as the domestic use amount of the discarded lithium secondary batteries increases in South Korea.

The amount of the lithium sulfate waste liquid is abundant, and a lithium concentration of the lithium sulfate waste liquid is very high (approximately 3,000 ppm). Therefore, development of a lithium recovery technology is highly demanded. However, existing methods using a series of processes including (absorption)-(desorptive condensation)-(solvent extraction or evaporative condensation)-(solvent extraction) are expensive (about $5/ton in the case of lithium carbonate). This makes it difficult to apply the existing methods.

Lithium carbonate is a high value material that can be used to manufacture lithium secondary batteries. However, since high-purity lithium hydroxide is employed to produce high-purity lithium carbonate, its production cost is high. In addition, since the particle size is not controlled during production, lithium carbonate having a desired particle size and high reactivity is produced through post-treatment such as fine grinding. This increases cost and burdens companies that produce lithium secondary batteries using lithium carbonate.

Therefore, there is an urgent demand for a comprehensive technology that enables production of lithium carbonate with an inexpensive treatment cost relative to the existing processes and allows control of the particle size during lithium carbonate production.

The patent documents and references cited herein are hereby incorporated by reference to the same extent as if each reference is individually and clearly identified.

CITATION LIST

Patent Literature

Patent Literature 1: Korean Patent No. 10-1604954

SUMMARY

In order to address a production cost increase problem caused by the additional post-treatment process in which a particle size is not controlled, the invention provides a method of producing high-purity lithium carbonate by controlling a particle size, a particle size distribution, and a particle shape using a lithium carbonate seed during a lithium carbonate purification process.

For this purpose, an object of the invention is to provide a method of producing high-purity lithium carbonate from low-purity crude lithium carbonate having a particle size of 20 to 200 μm in a polycrystalline state by controlling a particle size, a particle size distribution, and a particle shape using lithium carbonate seed crystals having a size of 2 to 5 μm.

Other objects and technical features of the present invention will be more apparent by reading the following detailed description of the invention, claims, and drawings.

According to an aspect of the invention, there is provided a method of producing high-purity lithium carbonate from low-purity crude lithium carbonate, the method including: a dissolution process of dissolving lithium carbonate by introducing a carbon dioxide gas or carbonic acid into slurry obtained by mixing a source material and water, the source material including crude lithium carbonate containing impurities and having an irregular particle size; a solid-liquid separation process of performing solid-liquid separation to supply a liquid to a purification process and return a solid to the dissolution process; a purification process of depositing sulfuric acid ions as impurities contained in the solution as insoluble barium sulfate to remove the sulfuric acid ions; a precipitation process of mixing the purified lithium carbonate solution with lithium carbonate seed crystals and precipitating lithium carbonate on surfaces of the lithium carbonate seed crystals; and a particle size control process of controlling a particle size, a particle size distribution, and a particle shape for the precipitated lithium carbonate particles.

The high-purity lithium carbonate obtained by controlling a particle size, a particle size distribution, and a particle shape has a particle size of 2 to 8 µm and contains little impurities such as a phosphor concentration of 0.005% or less, a sulfur concentration of 0.01% or less, and a sodium concentration of 0.02% or less.

The present invention provides a method of producing high-purity lithium carbonate by controlling a particle size, a particle size distribution, and a particle shape.

According to the present invention, it is possible to produce lithium carbonate having a purity of 99.5% or higher and containing little impurities such as a phosphor concentration of 0.005% or less, a sulfur concentration of 0.01% or less, and a sodium concentration of 0.02% or less. In addition, it is possible to produce high-purity lithium carbonate having a uniform particle size of 2 to 8 µm and excellent flowability by removing a sharp edge.

According to the present invention, high-purity lithium carbonate particles are used as a seed material, and lithium carbonate is precipitated on surfaces of the seed material during the carbonation process. Therefore, it is possible to produce high-purity lithium carbonate having a desired particle size by controlling the number of the carbonation process or a particle size of the seed material.

BRIEF DESCRIPTION OF THE DRAWINGS

The foregoing and additional features and characteristics of this disclosure will become more apparent from the following detailed description considered with reference to the accompanying drawings, wherein.

DETAILED DESCRIPTION

Figure 1:
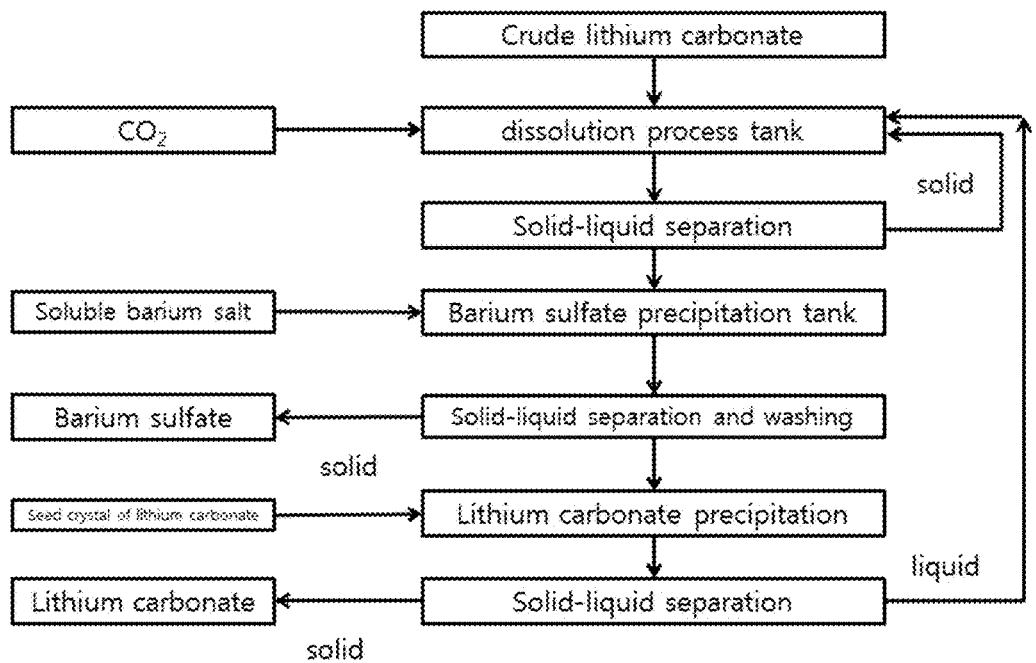
FIG. 1 illustrates a process of producing high-purity lithium carbonate by controlling a particle size, a particle size distribution, and a particle shape.

A method of producing high-purity lithium carbonate according to the invention includes: (a) a dissolution process for dissolving lithium carbonate by mixing crude lithium carbonate containing impurities and having an irregular particle size with water to obtain slurry and introducing a carbon dioxide gas or a carbonic acid into the slurry; (b) a solid-liquid separation process for performing solid-liquid separation for the slurry subjected to the dissolution process so that a liquid is used in a purification process and a solid is returned to the dissolution process; (c) a purification process for depositing sulfuric acid ions as an impurity contained in a solution obtained through filtration as insoluble barium sulfate and removing the deposit; (d) a precipitation process for mixing the purified lithium carbonate aqueous solution with lithium carbonate seed crystals and then precipitating lithium carbonate on surfaces of the lithium carbonate seed crystals; and (e) a particle size control process for controlling a particle size, a particle size distribution, and a particle shape of the precipitated lithium carbonate particles.

Steps (a) and (b): Dissolution of Low-Purity Crude Lithium Carbonate

Crude lithium carbonate used as a source material is polycrystals having a size of 20 to 200 µm and containing sodium and sulfuric acid ions as a main impurity by several thousands ppm. The amount of water used to obtain slurry using the crude lithium carbonate is preferably set to 5 to 20 parts by weight with respect to crude lithium carbonate of 1 parts by weight.

If the amount of water is smaller than 5 parts by weight, viscosity of the slurry increases and generates a process trouble. If the amount of water exceeds 20 parts by weight, an excessive amount of water is used, and this degrades process efficiency. A carbonic acid solution in which carbon dioxide is saturated in advance may be used as the water. In addition, filtered water obtained by removing lithium carbonate produced finally in the process (g) described below through solid-liquid separation may also be used.

Carbon dioxide for carbonation is added to increase the dissolution amount of lithium carbonate. By flowing a carbon acid gas into slurry of 1 liter at a flow rate of 500 ml/min for one hour and agitating it, the amount of the lithium carbonate dissolved in the lithium carbonate solution becomes 50 to 70 g. In this case, a temperature of the solution decreases, the lithium carbonate dissolution amount tends to increase. However, it is not necessary artificially perform cooling in terms of process economy.

Step (c): Removal of Impurity Through Primary Solid-Liquid Separation

The lithium carbonate components are perfectly dissolved and exist in ion states through the aforementioned carbonation process. As a result of the primary solid-liquid separation, water, any impurity not dissolved by the carbonation, or a small amount of crude lithium carbonate is obtained in a solid phase. In the primary solid-liquid separation, a continuous centrifugal dehydrator is preferably employed. In addition, a filter press machine, a sedimentation tank, and a pressure-sensitive filter may also be employed. A filtrate obtained therefrom is delivered to a lithium carbonate purification process as described below, and solids are returned to the (a) low-purity crude lithium carbonate dissolution process described above.

Steps (d) to (e): Purification Process—Removal of Sulfuric Acid Ions by Producing Barium Sulfate The purification process of step (d) is a process of depositing impurities such as sulfuric acid ions as insoluble barium sulfate and removing them. In this process, soluble barium salts such as barium nitrate, barium chloride, barium hydroxide, and barium sulfate are dissolved in water, and the produced barium salt aqueous solution is reacted with the filtrate. The barium sulfate deposits generated in this case are removed through solid-liquid separation. The soluble barium salt aqueous solution is added by a dosage of 0.9 to 1 molar equivalent to 1 molar equivalent of sulfuric acid to be removed by setting a salt concentration of 0.1 to 1 mole.

As the reactive temperature increases, the reactive rate becomes high, and the particle size of the generated barium sulfate also increases, so that filtration is facilitated advantageously. However, if fast reaction is not necessary, the barium sulfate deposit may be removed using a sediment tank and a filter press machine without a separate heating process. The barium sulfate has a high purity, so that it can be sold in the market after a predetermined washing process.

Step (f): Production of High-Purity Lithium Carbonate by Controlling Particle Size The lithium carbonate solution purified in step (e) is mixed with lithium carbonate seed crystals. Then, the mixture is heated, a lithium hydroxide aqueous solution is added, or the lithium hydroxide aqueous solution is added while heating the mixture. As a result, the dissolved lithium carbonate is additionally precipitated on the surfaces of the lithium carbonate seed crystals.

The lithium carbonate seed crystals have a particle size of 5 μm or smaller. Preferably, the lithium carbonate seed crystals have a particle size of 3 to 5 μm. If the particle size of the seed crystals is smaller than 3 μm, the precipitation rate of the lithium carbonate precipitated on the surface decreases, so that it is difficult to control the particle size. If the particle size of the lithium carbonate seed crystals is larger than 5 μm, it is difficult to control the particle size of final lithium carbonate particles to be smaller than 10 μm.

A dosage of the lithium carbonate seed crystals is preferably set to 5 g/L per one liter of the lithium carbonate solution. More preferably, a dosage of the lithium carbonate seed crystals is set to 5 to 50 g/L. If the dosage is smaller than 5 g/L, a probability of contact between lithium carbonate ions and lithium carbonate seed crystals is low, and the precipitation rate decreases. If the dosage exceeds 50 g/L, viscosity increases, and reaction efficiency is degraded.

In the precipitation reaction, unstable liquid-phase lithium bicarbonate contained in the solution is decomposed and reprecipitated as lithium carbonate. The precipitation reaction is influenced by a temperature, an agitation level, and a decompression level. As higher energy is supplied, the precipitation rate and the recovery rate of lithium carbonate increase. Considering a facility cost and a process cost, it is recommended that the temperature be set to 50 to 100° C., the agitation rate be set to 50 to 400 rpm, and the decompression level be set to 1 bar. The CO2 gas generated in this case is recovered and is reused in the crude lithium carbonate dissolution process.

The lithium carbonate precipitation reaction in this step can be performed just by adding the lithium hydroxide aqueous solution without heating. The lithium carbonate precipitation reaction using the lithium hydroxide solution can be expressed as the following Chemical Formula 1.

[Chemical Formula 1]

The LiOH aqueous solution used in the precipitation reaction of the lithium hydroxide preferably has a concentration of 0.2 to 2 mol/L. In addition, the dosage is set to the same equivalent weight as the amount of the dissolved lithium existing in the filtrate, and the injection rate is set to 100 ml/min. In the method of producing lithium carbonate using lithium hydroxide of the related art, it was necessary to use high-purity lithium hydroxide which is expensive. However, since the method according to the invention is an induced reaction for precipitating lithium on surfaces of high-purity lithium carbonate seed crystals, inexpensive low-purity lithium hydroxide can be employed advantageously.

Step (e): Step of Controlling Particle Size Distribution and Particle Shape

As the precipitation reaction of step (d) is terminated, most of the lithium carbonate particles have a size of 2 to 8 μm which is close to a target size. However, they have a hexagonal pole shape having sharp edges, and a part of particles exist as minute particles having a size of 2 μm or smaller. Accordingly, if a carbonic acid gas is blown to the lithium carbonate slurry, it reacts with water to produce carbonate or bicarbonate ions, which then react with the lithium carbonate to produce liquid-phase lithium bicarbonate. As a result, dissolution of the lithium carbonate is promoted. In the dissolution process, unstable particles having high surface energy, that is, minute particles and edge parts of particles are dissolved faster, and the remaining particles having a round shape and a uniform size are obtained. Therefore, if a carbon dioxide gas or carbonic acid is supplied to slurry subjected to the precipitation reaction, minute particles and sharp edges are removed, so that lithium carbonate particles having a uniform size and a uniform shape are obtained.

The low-purity crude lithium carbonate used as a source material according to the invention is obtained from discarded lithium secondary batteries.

The low-purity crude lithium carbonate is obtained through a first process for producing high-purity lithium phosphate from discarded lithium secondary batteries and a second process for producing high-purity lithium sulfate from the high-purity lithium phosphate and producing low-purity crude lithium carbonate from high-purity lithium sulfate.

The first process includes: Process (h): removing organic substances by passing a waste liquid of discarded lithium secondary batteries through activated carbon; Process (i): measuring a concentration of lithium ions contained in the waste liquid of the discarded lithium secondary batteries subjected to the removal of organic substances and adding soluble phosphate including $Na_3PO_4$, $Na_2HPO_4$, $NaH_2PO_4$, $K_3PO_4$, or $H_3PO_4$ or an aqueous solution of the soluble phosphate to the waste liquid by an equivalent weight twice the concentration of the lithium existing in the lithium waste liquid to produce a lithium phosphate waste liquid; Process (j): adding a pH conditioner containing NaOH or KOH to the phosphate-lithium waste liquid to maintain a pH value or 13 or higher and performing reaction at a temperature of 70° C. for 60 minutes, and then performing solid-liquid separation to produce low-purity lithium phosphate precipitated in a solid phase; Process (k): adding water of 10 parts by weight to the low-purity lithium phosphate and adding an acid including $H_3PO_4$, $H_2CO_3$, $H_2SO_4$, $HNO_3$, or HCl or an aqueous solution of the acid to produce a matured lithium phosphate liquid having a pH value of 10; Process (l): agitating the matured lithium phosphate liquid at the room temperature for 30 minutes or longer to mature the lithium phosphate; Process (m): adding the lithium hydroxide aqueous solution to the matured lithium phosphate liquid as much as an equivalent weight of the acid dosage to produce a lithium phosphate precipitation solution having a pH value of 13; and Process (n): agitating the lithium phosphate precipitation solution at a temperature of 70° C. for 60 minutes or longer to obtain high-purity lithium phosphate.

For example, the first process of producing high-purity lithium phosphate from discarded lithium secondary batteries is already known in the art as discussed in Korean Patent No. 10-1604954, assigned to the applicant.

The high-purity lithium phosphate can be produced by obtaining lithium phosphate by decomposing discarded lithium secondary batteries and adding the phosphate aqueous solution and the lithium hydroxide aqueous solution and maturing the lithium phosphate. The high-purity lithium phosphate is further purified such that lithium phosphate recombination is induced by further adding the phosphate aqueous solution and the lithium hydroxide aqueous solution to the lithium phosphate formed primarily by adding the phosphate aqueous solution, and impurities are removed from the solution through the recombination process.

The second process is a process of producing low-purity crude lithium carbonate from the high-purity lithium phosphate. This process includes: Step (o): producing a mixture of lithium phosphate and sulfuric acid aqueous solution by mixing the high-purity lithium phosphate with sulfuric acid aqueous solution; Step (p): condensing the mixture of the lithium phosphate and the sulfuric acid aqueous solution and performing solid-liquid separation to obtain high-purity lithium sulfate having a solid phase; Step (q): dissolving the high-purity lithium sulfate in water or a sodium hydroxide aqueous solution while maintaining a pH value of the lithium sulfate aqueous solution at 12 pH or higher, depositing remaining phosphate as lithium phosphate, and performing solid-liquid separation to obtain a lithium sulfate aqueous solution by removing phosphoric component; and Step (r): adding carbonate, carbonate aqueous solution, or a carbonic acid gas to the lithium sulfate aqueous solution, depositing lithium carbonate, and performing solid-liquid separation to obtain low-purity crude lithium carbonate having a polycrystalline state having a particle size of 20 to 200 µm in a solid phase.

The second process can be classified into a process of producing high-purity lithium sulfate from high-purity lithium phosphate and a process of producing low-purity crude lithium carbonate from high-purity lithium sulfate.

The process of producing high-purity lithium sulfate from the high-purity lithium phosphate includes Steps (o) and (p). The process of producing low-purity crude lithium carbonate from high-purity lithium sulfate includes Steps (q) and (r).

The filtrate obtained through the solid-liquid separation of Step (p) is mixed with sodium hydroxide and is used in production of the lithium phosphate-waste liquid of the first process. The filtrate is a phosphate aqueous solution and is used in production of the lithium phosphate-waste liquid of the first process and deposition of the low-purity lithium phosphate. For this purpose, the filtrate may be stored in a reservoir of the sodium phosphate aqueous solution and may react with sodium hydroxide so as to exist in the state of soluble phosphate including $Na_3PO_4$, $Na_2HPO_4$, $NaH_2PO_4$, $K_3PO_4$, or $H_3PO_4$ or an aqueous solution of the soluble phosphate used in deposition of the low-purity lithium phosphate. In addition, the solid-phase lithium phosphate obtained through the solid-liquid separation of Step (q) is used to produce a liquid mixture between lithium phosphate and sulfuric acid of Step (o). The lithium phosphate is mixed with the sulfuric acid aqueous solution and is decomposed.

If the lithium phosphate and the sulfuric acid aqueous solution are mixed in the process of producing high-purity lithium sulfate from high-purity lithium phosphate, the lithium phosphate is decomposed by the sulfuric acid. The lithium sulfate ($Li_2SO_4$) is precipitated as solids, and lithium, sulfuric acid, and phosphoric acid remain in a liquid phase as expressed in the following Chemical Formula 2 (Step (o)).

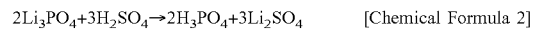

$2Li_3PO_4 + 3H_2SO_4 \rightarrow 2H_3PO_4 + 3Li_2SO_4$     [Chemical Formula 2]

In the reaction of sulfuric acid, 1:1 sulfuric acid (50% sulfuric acid) is added at a ratio of 1.3 to 1.4 parts by weight to 1 parts by weight of lithium phosphate slurry having a solid content concentration of about 50% and is then agitated in order to perfectly dissolve the lithium phosphate. In this case, the temperature of the reaction liquid becomes 30 to 50° C. due to heat of neutralization. Therefore, separate cooling or heating is not necessary.

A condensation and solid-liquid separation process may be repeatedly applied in order to recover remaining sulfuric acid and lithium contained in the liquid separated through the solid-liquid separation (step (p)).

If concentrations of the sulfuric acid and the lithium contained in the liquid increase through the condensation, they are precipitated as lithium sulfate. Therefore, the lithium sulfate can be separated through solid-liquid separation and may be used to produce lithium carbonate. In addition, the liquid subjected to recovery of lithium sulfate contains phosphoric acid as a main component and also contains a small amount of sulfuric acid ions and lithium ions. Sodium hydroxide (NaOH) is added to the phosphoric acid contained in the solution by an equivalent weight or more to set a pH value to 13 or higher, and this may be used as a source material of the lithium phosphate recovery process. The waste liquid of the lithium phosphate recovery process contains phosphoric acid. Therefore, in order to externally discharge it after removing phosphoric acid, the phosphoric acid is removed by applying the waste water to an insoluble phosphate production process including a calcium hydroxide reaction, a carbon dioxide (carbon acid gas) reaction, an aluminum sulfate reaction, and solid-liquid separation. Then, the resulting liquid may be externally discharged.

Production of low-purity crude lithium carbonate from high-purity lithium sulfate includes: Step (q) for dissolving lithium sulfate in water or a sodium hydroxide aqueous solution, depositing remaining phosphoric acid as lithium phosphate while maintaining a pH value of the solution at 12 or higher, and obtaining a lithium sulfate aqueous solution in which a phosphoric component is removed through solid-liquid separation; and Step (r) of adding carbonate (or its aqueous solution) or a carbonate gas to this aqueous solution, depositing lithium carbonate, performing solid-liquid separation to obtain low-purity crude lithium carbonate.

A lithium sulfate aqueous solution is produced by dissolving the lithium sulfate obtained from the lithium phosphate produced from discarded lithium secondary batteries in water, and its pH value is adjusted to 12 to 13 using sodium hydroxide, so that a lithium sulfate aqueous solution is obtained (Step (q)).

The pH value of the lithium sulfate aqueous solution is maintained at 12 or higher using a sodium hydroxide aqueous solution or the like, and the concentration of the lithium sulfate is adjusted to 0.3 to 2.4 M. Then, reaction is performed for 20 minutes to 2 hours at a temperature of 50° C. or higher for solid-liquid separation. As a result, a lithium sulfate aqueous solution having no phosphoric acid component is obtained. The lithium phosphate obtained at the same time as a solid phase is used as a source material in Step (o).

The aforementioned pH adjustment is an important factor for determining efficiency of the carbonation reaction using sodium bicarbonate, sodium carbonate, or a carbonic acid gas. Efficiency of the carbonation reaction using the carbonic acid gas is degraded if the pH value of the reaction liquid is equal to or lower than 9. Therefore, the pH value of the lithium sulfate aqueous solution is adjusted to 9 or higher, preferably 12 to 13, and most preferably, 13. In this case, if an aqueous solution having a sodium hydroxide (NaOH) concentration of 0.1 N is used, or if lithium sulfate is perfectly dissolved first in water, and NaOH or its aqueous solution of 0.1 N is added, most of the phosphoric acid components contained in the lithium sulfate are deposited as lithium phosphate. In this case, as a temperature increases, the reaction rate increases. Therefore, the temperature is preferably set to 80 to 100° C. In the carbonation method of the prior art, the pH conditioner is not employed, and sodium bicarbonate or sodium carbonate is directly applied. If sodium bicarbonate or sodium carbonate is used as the pH conditioner, it is possible to perform a carbonation reaction without additionally performing pH adjustment. However, if the sulfuric acid concentration is high, a liquid-liquid reaction occurs between the lithium sulfate aqueous solution and the sodium carbonate aqueous solution (sodium bicarbonate aqueous solution) to form flocs. Since the floc contains lithium carbonate formed through carbonation, the amount of lithium carbonate produced finally is reduced disadvantageously.

According to the invention, the sodium hydroxide serves as a pH conditioner for changing only the pH value without generating a liquid-liquid reaction with the lithium sulfate aqueous solution. Therefore, advantageously, no floc is formed in the lithium carbonate production process according to the invention. If the pH value of the lithium sulfate aqueous solution increases to 12 to 13 pH by using sodium hydroxide as in the present invention, the lithium phosphate contained in the lithium sulfate aqueous solution is also precipitated. The precipitated lithium phosphate is separated through solid-liquid separation, and may be then used to produce lithium sulfate along with the lithium phosphate produced from discarded lithium secondary batteries.

Lithium carbonate is deposited by adding carbonates (or its aqueous solution) or a carbonic acid gas to the lithium sulfate aqueous solution, and low-purity crude lithium carbonate is obtained by performing solid-liquid separation for the deposited lithium carbonate (Step (r)).

Carbonation is performed for the lithium sulfate aqueous solution obtained by adjusting the pH value to 12 to 13 and removing remaining lithium phosphate through solid-liquid separation. Sodium bicarbonate, sodium carbonate, or a carbonic acid gas may be used in the carbonation reaction. If carbonation is performed using the sodium bicarbonate or the sodium carbonate, lithium sulfate ($Li_2SO_4$) is decomposed to lithium carbonate ($Li_2CO_3$) and sodium sulfide ($Na_2SO_4$) as expressed in the following Chemical Formula 3, and the lithium carbonate deposited through solid-liquid separation can be obtained in a solid phase while the sodium sulfide remains in a liquid phase.

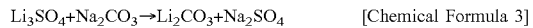
$Li_3SO_4 + Na_2CO_3 \rightarrow Li_2CO_3 + Na_2SO_4$     [Chemical Formula 3]

If carbonation is performed using the carbonic acid gas by adjusting the pH value of sodium hydroxide as in the present invention, lithium sulfate is decomposed into sodium carbonate and sodium sulfide as expressed in the following Chemical Formula 4. In addition, the sodium carbonate obtained as described above may be converted into sodium bicarbonate again as expressed in the following Chemical Formula 5.

$Li_3SO_4 + Na_2OH + CO_2 \rightarrow Li_2CO_3 + Na_2SO_4$     [Chemical Formula 4]

$Li_2CO_3 + H_2O + CO_2 \leftrightarrows LiHCO_3$     [Chemical Formula 5]

Specifically, a concentration of the lithium sulfate aqueous solution is set to 0.3 to 2.4 M, and a sodium carbonate aqueous solution having the same equivalent weight is reacted. Alternatively, a sodium hydroxide aqueous solution having the same equivalent weight is mixed, and a carbonic acid gas (carbon dioxide) is added. Then, reaction is generated at a temperature of 30° C. or higher for 20 minutes to 2 hours, and solid-liquid separation is performed. The sodium bicarbonate and the sodium carbonate may form flocs through the liquid-liquid reaction with the lithium sulfate aqueous solution. Therefore, carbonation efficiency can be improved by using the carbonic acid gas that does not form floc. In a case where the carbonic acid gas is supplied, the lithium carbonate purity increases relative to a case where sodium carbonate is used. The injection rate of the carbonic acid gas is preferably set to 300 to 1,000 ml/min. If carbonation is performed using the carbonic acid gas, the pH value decreases, and efficiency of the carbonation reaction also decreases. Therefore, considering a carbonation level and pH reduction, the carbonic acid gas is preferably injected within 30 minutes, so as to stop the carbonation reaction at the pH atmosphere of 9 to 10.

In summary, in the method of producing high-purity lithium carbonate by controlling a particle size, a particle size distribution, and a particle shape according to the invention, 85% or more of the crude lithium carbonates used as a source material are recovered in the form of lithium carbonate having a size of 2 to 8 μm while controlling the particle size, particle distribution, and particle shape. The lithium carbonate produced according to the invention has a purity of 99.5% or higher. In addition, the impurity concentration is low. For example, a phosphor concentration is equal to or lower than 0.005%, a sulfur concentration is equal to or lower than 0.01%, and a sodium concentration is equal to or lower than 0.02%. Furthermore, the lithium carbonate has a particle size of 4 to 10 μm, which provides a wide relative surface area. Therefore, it is possible to provide high-purity lithium carbonate with excellent reactivity.

EXAMPLES

<Example 1> Production and Purification of Lithium Phosphate from Discarded Lithium Secondary Battery Waste Liquid First, elements of a pouch type discarded lithium secondary battery were analyzed. As a result, a single battery has a total weight of 35.46 g, including a cover film of 0.51 g (1.4%), a plastic cap of 0.41 g (1.1%), a circuit board of 1.57 g (4.4%), and a battery module of 32.98 g (93%). In addition, it was analyzed that a powder layer coated on the surface of the battery has a weight of 1.98 g (5.6%) and contains iron (Fe) as a main component. The battery pouch was formed of aluminum and has a weight of 7.72 g (21.8%). It was found that corrosion is accelerated, and aluminum oxide is generated when the battery pouch is immersed in salt water. The battery internally includes a plastic separation film, an aluminum laminated film (cathode), a cathode active material, a copper laminated film (anode), and an anode active material. The plastic separation film has a weight of 1.05 g (2.96%), the aluminum laminated film has a weight of 3.26 g (9.2%), the cathode active material has a weight of 10.32 g (29.1%), the copper laminated film has a weight of 2.76 g (7.8%), and the anode active material has a weight of 5.96 g (16.8%).

<Example 1-1> Removal of Organic Substance from Discarded Lithium Secondary Battery Waste Liquid In this example, a lithium waste liquid of 1 ton generated in the process of recovering cobalt and nickel in recycling of the discarded lithium secondary battery was used. Elements of the lithium waste liquid and their pH values were analyzed. As a result, it was found that the lithium waste liquid has a pH value of 5 to 7, and the lithium waste liquid contains lithium ions ($Li^+$) of 2,990 ppm, sodium ($Na^+$) of 12,030 ppm, sulfuric acid ions ($SO_4^{2-}$) of 50,500 ppm, and organic substances of 130 ppm. In order to remove any organic substance from the lithium waste liquid, activated carbon was employed. This process was performed by passing the lithium waste liquid through an activated carbon absorption tower.

<Example 1-2> Production of Lithium Phosphate from Discarded Lithium Secondary Battery Waste Liquid On the basis of the experimental examples of the present invention, it was possible to obtain an optimum condition for producing the lithium phosphate as described below. Specifically, the lithium ions and phosphoric acid ions were added to the discarded lithium secondary battery waste liquid by setting a ratio of the equivalent weights of the lithium ions and phosphoric acid ions to "1:2". NaOH was used as a pH conditioner to maintain the pH value equal to or higher than 13. A reaction temperature was set to 70° C., and a reaction time was set to 1 hour. By precipitating lithium phosphate under this reaction condition, it was possible to produce lithium phosphate having a particle size of 5 to 100 μm, a three-dimensional spherical shape, an improved specific surface area, and excellent reactivity.

A method of producing lithium phosphate from the discarded lithium secondary battery waste liquid is already known in the art as discussed in Korean Patent No. 10-1604954, assigned to the applicant.

The inventors sophisticated the prior art by applying the method of producing lithium phosphate described above as follows.

Any organic substance is removed by passing the discarded lithium secondary battery waste liquid through activated carbon.

A concentration of lithium ions contained in the discarded lithium secondary battery waste liquid obtained by removing the organic substance was measured. Then, soluble phosphate including $Na_3PO_4$, $Na_2HPO_4$, $NaH_2PO_4$, $K_3PO_4$, or $H_3PO_4$ or an aqueous solution of the soluble phosphate was added to the lithium waste liquid by an equivalent weight twice that of the lithium concentration of the lithium waste liquid (molar ratio was set to Li:$PO_4$=1:2).

A pH conditioner containing NaOH or KOH was added to maintain a pH value of 13 or higher, and the lithium and the phosphate were reacted at a temperature of 70° C. for 60 minutes. Then, solid-liquid separation was performed, and lithium phosphate was precipitated in a solid phase.

Since the liquid separated through the solid-liquid separation contains phosphoric acid, it is externally discharged after removing the phosphoric acid through an insoluble phosphate production process in which calcium hydroxide, a carbonic acid gas, and aluminum sulfate are reacted, and solid-liquid separation is then performed.

Water was added to the produced lithium phosphate (solids) as much as ten times a weight of the lithium phosphate, and an acid including $H_3PO_4$, $H_2CO_3$, $H_2SO_4$, $HNO_3$, or HCl or an aqueous solution of the acid was added, so that a matured lithium phosphate liquid having a pH value of 10 was produced. Then, the lithium phosphate was matured by agitating the liquid at the room temperature for 30 minutes or longer.

A lithium phosphate precipitation solution having a pH value of 13 was produced by adding a lithium hydroxide aqueous solution to the matured lithium phosphate liquid as much as an equivalent weight of the acid dosage. Then, high-purity lithium phosphate was precipitated by agitating the lithium phosphate precipitation solution at a temperature of 70° C. for 60 minutes or longer.

The precipitated lithium phosphate was subjected to washing and drying. As a result, high-purity lithium phosphate particles containing sodium and sulfur by 500 ppm or less and 100 ppm or less, respectively, as impurities and having a particle size of 5 to 100 μm and a three-dimensional spherical shape with an improved specific surface area was produced.

The liquid recovered through the solid-liquid separation performed after maturing of the lithium phosphate and through washing of the precipitated lithium phosphate and the solid-liquid separation is a phosphoric acid aqueous solution, which is also reused as the phosphoric acid aqueous solution added to the lithium waste liquid.

Figure 5:
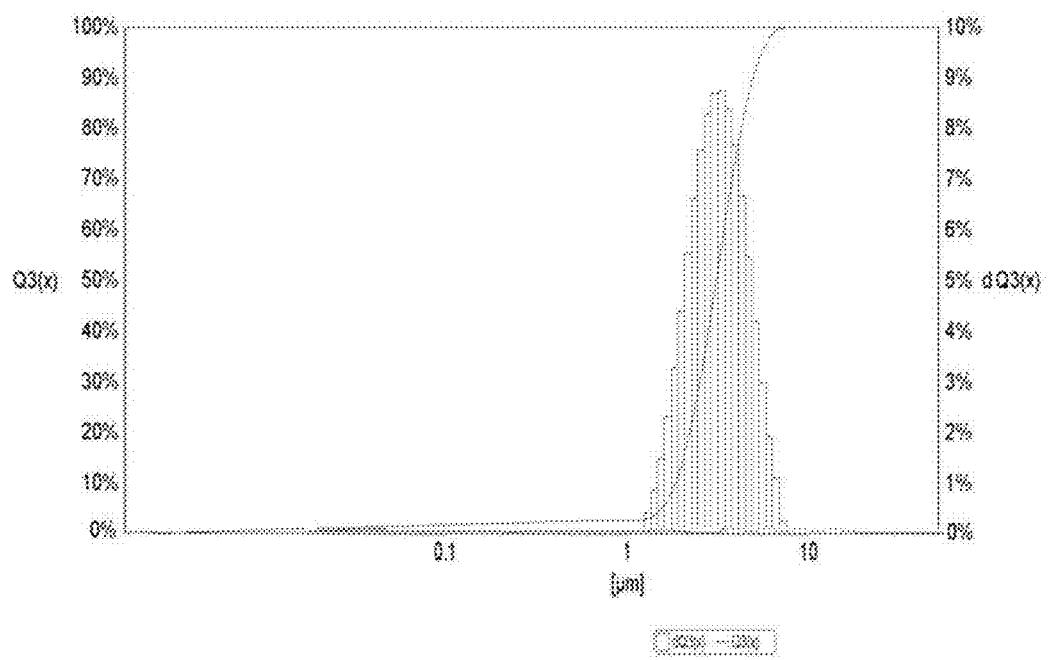
FIG. 5 is a particle size distribution diagram of the product of FIG. 4.

<Example 2> Production of Lithium Sulfate Using Lithium Phosphate Produced from Discarded Lithium Secondary Battery Waste Liquid 50% sulfuric acid of 508 g and distilled water of 316 g were mixed with the high-purity spherical lithium phosphate of 200 g produced from discarded lithium secondary batteries (lithium phosphate:sulfuric acid=1:1.2 parts by weight). Then, the mixture was reacted in a reaction chamber having a circulation cooler at a temperature of 30 to 50° C. for two hours. As a result, it was found that the lithium phosphate is decomposed into lithium sulfate ($Li_2SO_4$) and phosphoric acid ($H_3PO_4$) (refer to FIG. 5). Solid-liquid separation was performed to recover the produced lithium sulfate. The solubility of lithium sulfate is degraded if the lithium sulfate exists in the aqueous solution at a high concentration. Therefore, lithium sulfate was further obtained by condensing the filtrate obtained by removing sediments (lithium sulfate) after the solid-liquid separation and performing the solid-liquid separation again. This condensation and solid-liquid separation process was repeated until lithium sulfate is not precipitated any more from the condensation of the separated liquid (filtrate). The condensation and solid-liquid separation process was repeated by five cycles, which was sufficient. If the lithium sulfate is not precipitated any more, this means that sulfuric acid is entirely removed from the filtrate, so that phosphoric acid and lithium remain in the filtrate. The aqueous solution mainly contains phosphoric acid, which is a strong acid having a pH value of approximately 1 to 2. The pH value of the aqueous solution was raised to 2.5 or higher by using NaOH, and solid-liquid separation was then performed. As a result, lithium phosphate was deposited and separated as solids, and the phosphoric acid was separated as an aqueous solution. The lithium phosphate separated as solids was used as a material for producing lithium sulfate (refer to FIG. 1). A lithium sulfate recovery method well known in the art was employed, in which lithium sulfate is precipitated by heating and condensing the lithium sulfate aqueous solution. This lithium sulfate recovery method based on heating and condensation necessitates an expensive heating device and an expensive purification facility for treating the acidic vapor generated during condensation. This disadvantageously increases cost. According to the present invention, the condensation and the solid-liquid separation process is repeatedly performed. Therefore, such expensive facilities for heating and purification are not necessary. Accordingly, it is possible to reduce cost advantageously.

As a result of the condensation and solid-liquid separation process, a thin solution of phosphoric acid of 768 g containing impurities was recovered as a filtrate. NaOH was added to the phosphoric acid contained in this solution as much as the equivalent weight or more to set the pH value to 13 or higher. Then, the phosphoric acid was recycled as a source material of the lithium phosphate recovery process. The solid phase of the lithium sulfate has a weight of 210 g. This was washed with water of 42 ml and was filtered again. As a result of the filtering, a filtrate of 45 g was obtained. This was washed using water of 42 ml and was then filtered again. As a result of the filtering, a filtrate of 45 g and pure lithium sulfate particles of 173 g were obtained (refer to FIG. 5).

A sample component analysis was performed for a sample of the lithium phosphate decomposition process using the lithium sulfate described above. As a result, it was analyzed that pure lithium sulfate can be obtained (refer to Table 1).

TABLE 1

| Name | Weight (g) | Solution(mg/L) | | | Sample(mg/g) | | |
|---|---|---|---|---|---|---|---|
| | | $SO_4^{-2}$ | $PO_4^{-3}$ | Li | $SO_4^{-2}$ | $PO_4^{-3}$ | Li |
| Sample before decomposition of lithium phosphate using sulfuric acid | 2100.0 | 77696.0 | 351847.5 | 130840.3 | 41.0 | 185.8 | 69.1 |
| Sample (I) before decomposition of lithium phosphate using sulfuric acid | 86.0 | 627391.8 | 0.0 | 140264.9 | 579.2 | 0.0 | 129.5 |
| Sample (II) before decomposition of lithium phosphate using sulfuric acid | 76.0 | 796173.7 | 0.0 | 160120.1 | 774.8 | 0.0 | 155.8 |

<Example 3> Production of Low-Purity Crude Lithium Carbonate Using Lithium Sulfate Produced from Discarded Lithium Secondary Battery Waste Liquid Distilled water was added to the precipitated lithium sulfate particles, and agitation was performed at a temperature of 80° C. to obtain a lithium sulfate aqueous solution (500 ml). The lithium sulfate aqueous solution obtained by perfectly dissolving the lithium sulfate was used as a source material for producing lithium carbonate. The pH value was adjusted to 12 or higher by adding sodium hydroxide (NaOH) to the lithium sulfate aqueous solution (refer to FIG. 1). In the prior art, the pH value was adjusted using sodium carbonate. If the sodium carbonate is used as the pH conditioner, a liquid-liquid reaction occurs between the lithium sulfate aqueous solution and the sodium carbonate aqueous solution, and this generates flocs. In order to change the pH value of the lithium sulfate aqueous solution which is a strong acid (pH 2) into 12 to 13, an excessive amount of sodium carbonate is necessary. In this floc, non-removed impurities such as phosphoric acid as well as lithium carbonate produced through carbonation are also coagulated. Therefore, if the pH value is adjusted using sodium carbonate, it is difficult to remove the impurity during the carbonation process, or a yield of the lithium carbonate is degraded due to the floc disadvantageously.

In comparison, according to the present invention, sodium hydroxide (NaOH) is employed as the pH conditioner instead of the sodium carbonate. If the sodium hydroxide is used as the pH conditioner, no liquid-liquid reaction occurs, and no floc is formed. In addition, since the phosphoric acid serving as a main impurity in the pH variation is coagulated as lithium phosphate, the yield degradation of the lithium carbonate caused by the floc does not occur, and the phosphoric acid as an impurity is easily precipitated and separated as lithium phosphate. The lithium phosphate precipitated in this process is subjected to washing and is then recycled as high-purity lithium phosphate for producing lithium carbonate using lithium sulfate. The pH adjustment using the sodium hydroxide was performed to adjust the pH value of the lithium sulfate aqueous solution (pH 2) to a pH value of 12 to 13. If the lithium sulfate aqueous solution has a pH value of 12 to 13, the phosphoric acid contained in the aqueous solution is deposited as lithium phosphate in the carbonation process. In addition, a concentration of the lithium sulfate was adjusted to 0.3 M to 2.4 M, and reaction was performed at a temperature of 50° C. for 20 minutes to 2 hours. Then, solid-liquid separation was performed. As a result a lithium sulfate aqueous solution was obtained by removing the phosphoric acid component. In this case, the reaction rate and the reaction speed increase as the temperature increases. Therefore, a temperature of 80 to 100° C. is preferable. The lithium phosphate recovered through the solid-liquid separation was washed and then recycled as high-purity lithium phosphate for producing lithium sulfate.

A carbonation process was performed for the lithium sulfate aqueous solution in which a phosphor component was removed through filtration by using sodium carbonate ($Na_2CO_3$) or a carbonic acid gas ($CO_2$). Preferably, the carbonation process was performed using the carbonic acid gas ($CO_2$). A change of the pH value was observed while injecting the carbonic acid gas (at an injection rate of 300 to 1,000 ml/min) to the lithium sulfate aqueous solution having a controlled pH value (refer to Table 2).

TABLE 2

| | Injection time (min) | | | | | | |
|---|---|---|---|---|---|---|---|
| | 0 | 30 | 60 | 90 | 120 | 150 | 180 |
| Temperature (° C.) | 20 | 7.1 | 5.9 | 5.7 | 5.4 | 5.2 | 5.2 |
| pH | 11.19 | 8.26 | 7.82 | 7.66 | 7.44 | 7.38 | 7.38 |

As a result, it was observed that the pH value is reduced to 8.26 or lower after 30 minutes. A relationship between the carbonation and the pH value was analyzed, and it was found that the best carbonation efficiency was obtained at a pH value of 9 to 10. Therefore, it is preferable to perform the carbonation process by injecting the carbonic acid gas for 10 to 30 minutes. More preferably, the carbonation is performed by injecting the carbonic acid gas for 20 minutes.

In the carbonation process of the prior art, the pH adjustment and the carbonation were performed simultaneously by using sodium carbonate, and the carbonic acid gas was additionally used in order to improve carbonation efficiency. However, according to the present invention, in order to adjust the pH value, the lithium sulfate aqueous solution and the sodium hydroxide that does not generate a liquid-liquid reaction are employed, and the carbonation is then performed using the carbonic acid gas. Therefore, no floc is generated during the pH adjustment process, and phosphor as an impurity is deposited as lithium phosphate, which is then perfectly removed. Therefore, it is possible to produce a high-purity lithium sulfate aqueous solution and perform carbonation using this lithium sulfate aqueous solution. The lithium carbonate deposited through the carbonation process was recovered through filtration, and the filtrate was externally discharged (refer to FIGS. 1 and 5). The components of the lithium carbonate produced through the carbonation process were analyzed. The result is shown in Table 3.

TABLE 3

|  | Li | S | Na | P |
|---|---|---|---|---|
| lithium carbonate | 16.33% | 1.38% | 1.542% | 0.006% |

The external discharge operation is restrictively performed only when the content of the phosphoric acid in the course of the pH adjustment is equal to or smaller than 2 ppm. However, the content of the phosphoric acid in the filtrate may be equal to or larger than 2 ppm in some cases. Therefore, an insoluble phosphate production process was performed on the basis of a reaction between calcium hydroxide, a carbonic acid gas, and aluminum sulfate to adjust the content of phosphor to 2 ppm or smaller for purification, and the purified filtrate was discharged externally.

<Example 4> Production of High-Purity Crude Lithium Carbonate by Controlling Particle Size, Particle Size Distribution, and Particle Shape It was analyzed that the crude lithium carbonate used as a source material contains sodium and sulfuric acid ions of several thousands ppm as main impurities and is polycrystalline having a particle size of 20 to 200 μm. The crude lithium carbonate was produced as slurry by adding water of 30 parts by weight to crude lithium carbonate of 1 parts by weight.

For carbonation of the slurry, the carbon dioxide was supplied at a flow rate of 500 ml/min for one hour, and was then agitated. As a result of the carbonation, a lithium carbonate solution containing lithium carbonate of 50 to 70 g was obtained.

Solid-liquid separation (primary solid-liquid separation) was performed for the slurry subjected to the carbonation process described above. The solid-liquid separation was performed using a continuous centrifugal dehydrator, a filter press machine, a sedimentation tank, a pressure-sensitive filter, and the like. The filtrate obtained through the solid-liquid separation contains sulfuric acid ions. In order to remove the sulfuric acid ions, a barium salt aqueous solution obtained by dissolving soluble barium salts such as barium nitrate, barium chloride, barium hydroxide, and barium sulfate in water was reacted with the filtrate. The salt concentration of the soluble barium salt aqueous solution was set to 0.1 to 1 mole, and a dosage was set to 0.9 to 1 molar equivalent with respect to 1 molar equivalent of sulfuric acid ions to be removed. As a result of the reaction, barium sulfate was deposited, and solid-liquid separation (secondary solid-liquid separation) was performed. High-purity barium sulfate having a solid phase was obtained through the solid-liquid separation.

A lithium carbonate deposition reaction was performed for the filtrate obtained through the secondary solid-liquid separation. In order to precipitate lithium dissolved in the filtrate, lithium carbonate seed crystals having a particle size of 3 to 5 μm were employed. A dosage of the lithium carbonate seed crystals was set to 25 g/L with respect to a lithium carbonate solution of 1 liter. The precipitation reaction was performed at a temperature of 50 to 100° C. with an agitation rate of 50 to 400 rpm under a decompressed condition of 1 bar or lower.

In addition, a precipitation reaction was performed using the lithium hydroxide aqueous solution. The reaction was performed by adding lithium carbonate seed crystals as described above, adding a lithium hydroxide aqueous solution of 0.2 to 2 mole by the same equivalent weight as the amount of the dissolved lithium, and setting the injection speed to 5 to 100 ml/min.

Figure 2:
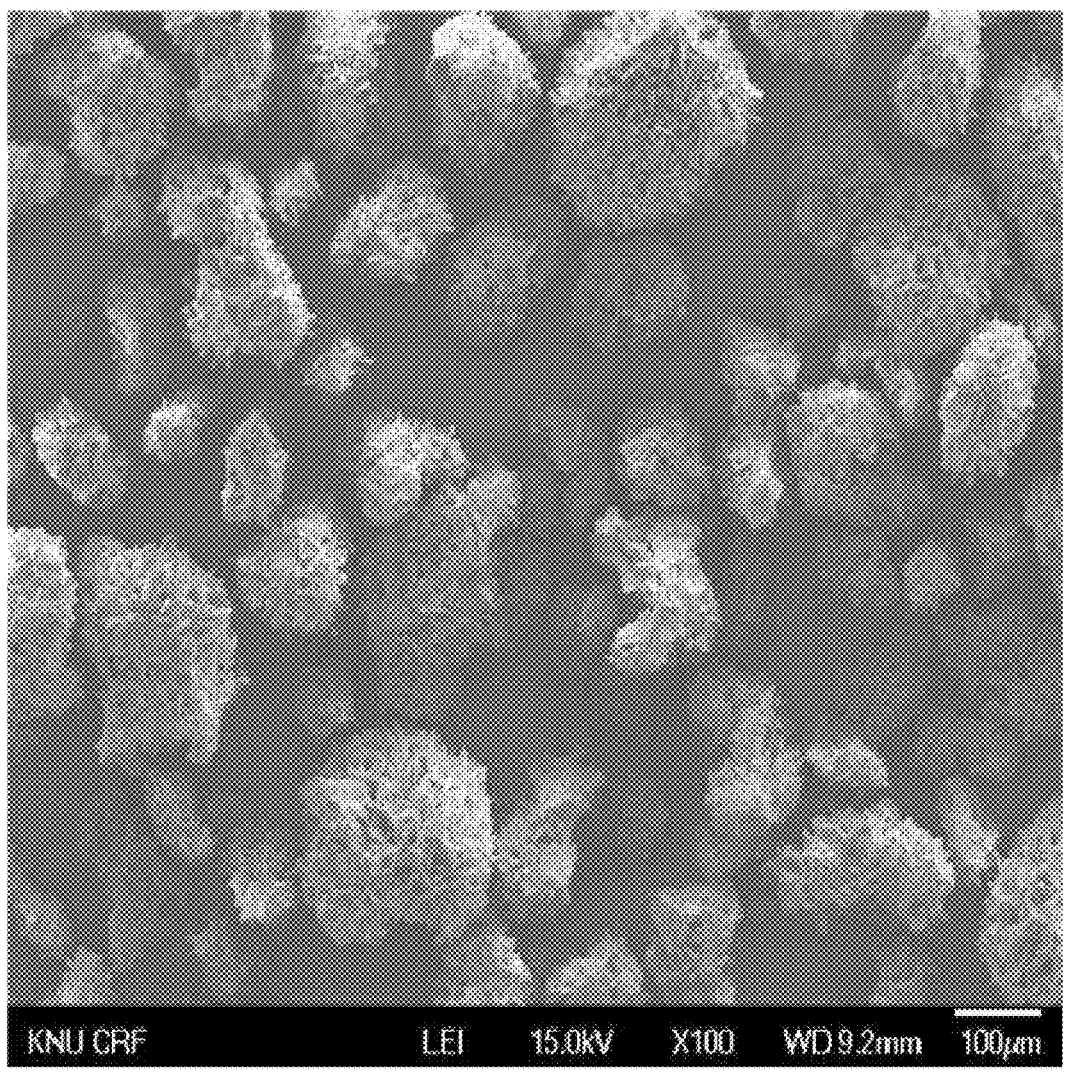
FIG. 2 is a SEM photograph of crude lithium carbonate as a source material.
Figure 3:
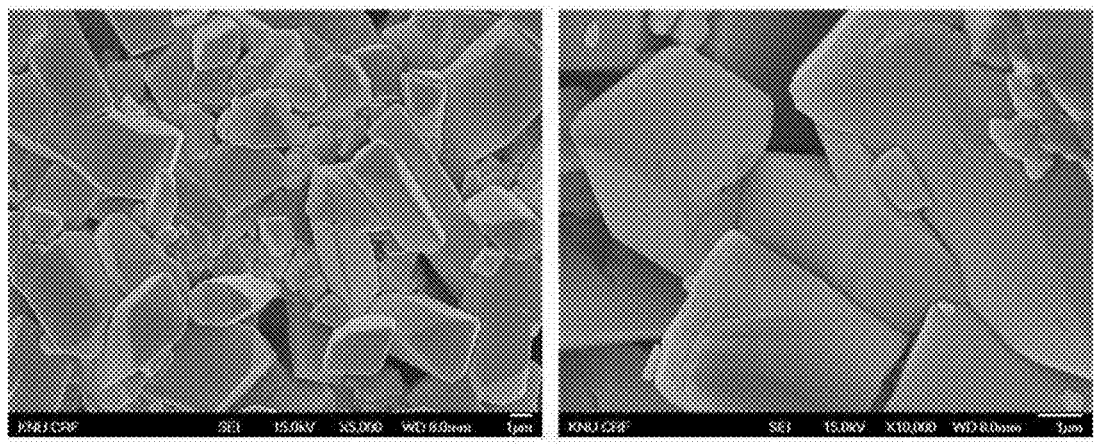
FIG. 3 is a SEM photograph of high-purity lithium carbonate obtained through a reprecipitation process after a purification process.
Figure 4:
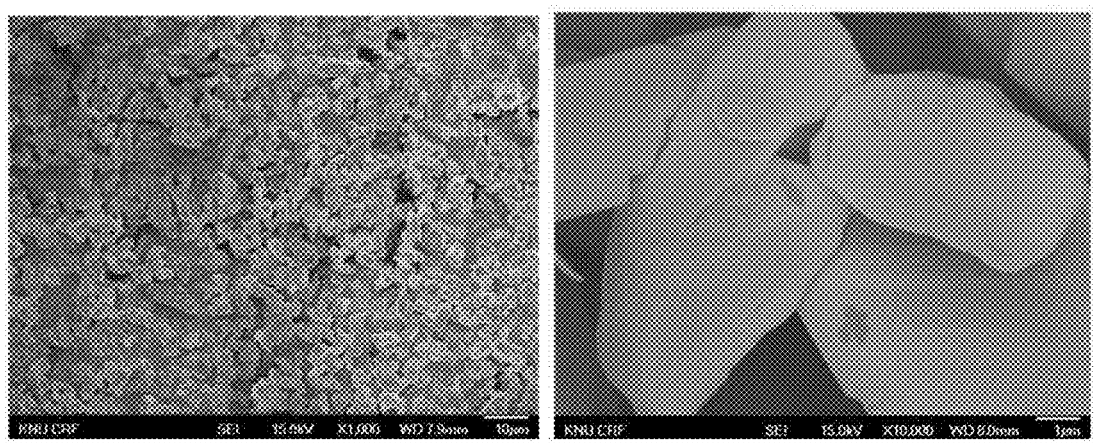
FIG. 4 is a SEM photograph of high-purity lithium carbonate obtained by controlling a particle size, a particle size distribution, and a particle shape.

It was observed that the lithium carbonate particles produced through the precipitation reaction have a hexagonal pole shape having sharp edges, and a part of the particles exist as fine particles having a size of 2 μm or smaller (refer to FIG. 2). For this reason, carbonation was additionally performed by blowing a carbonic acid gas to the lithium carbonate slurry under the aforementioned condition. As a result of the carbonation, it was possible to obtain high-purity lithium carbonate by controlling a particle size, a particle size distribution, and a particle shape (refer to FIGS. 3 and 4).

A scanning electron microscope (SEM) analysis and a particle size analysis were performed for the obtained lithium carbonate. As a result, it was observed that lithium carbonate was recovered while a particle size, a particle size distribution, and a particle shape are controlled to a size of 2 to 8 μm (refer to FIG. 5). In addition, it was observed that the lithium carbonate has a purity of 99.5% or higher, and contains little impurities such as a phosphor concentration of 0.005% or lower, a sulfur concentration of 0.01% or lower, and a sodium concentration of 0.02% or lower.

What is claimed is:

1. A method of producing high-purity lithium carbonate from low-purity crude lithium carbonate by controlling a particle size, a particle size distribution, and a particle shape, the method comprising steps of:
   (a) producing crude lithium carbonate slurry by mixing low-purity crude lithium carbonate having a polycrystalline state and a size of 20 to 200 μm with water;
   (b) carbonating and dissolving the crude lithium carbonate slurry;
   (c) performing primary solid-liquid separation for the carbonated crude lithium carbonate slurry to obtain a filtrate;
   (d) adding soluble barium salts to the filtrate obtained in the primary solid-liquid separation to deposit barium sulfate;
   (e) performing secondary solid-liquid separation for the filtrate containing the deposited barium sulfate to obtain a filtrate;

(f) mixing lithium carbonate seed crystals with the filtrate obtained from the secondary solid-liquid separation and precipitating lithium carbonate dissolved in the filtrate on surfaces of the lithium carbonate seed crystals to produce high-purity lithium carbonate slurry containing high-purity lithium carbonate; and (g) carbonating the high-purity lithium carbonate slurry to produce high-purity lithium carbonate.

2. The method according to claim 1, wherein the low-purity crude lithium carbonate is produced through a first process in which high-purity lithium phosphate is produced from discarded lithium secondary batteries, and a second process in which high-purity lithium sulfate is produced from the high-purity lithium phosphate and low-purity crude lithium carbonate is produced from the high-purity lithium sulfate.

3. The method according to claim 2, wherein the first process includes steps of (h) removing an organic substance by passing a discarded lithium secondary battery waste liquid through activated carbon, (i) measuring a concentration of lithium ions contained in the discarded lithium secondary battery waste liquid obtained by removing the organic substance and adding soluble phosphate at an equivalent weight twice a concentration of the lithium contained in the lithium waste liquid to produce a lithium phosphate waste liquid, (j) performing reaction at a temperature of 70° C. for 60 minutes by adding a pH conditioner containing NaOH or KOH to the lithium phosphate waste liquid to maintain a pH value at 13 or higher and then performing solid-liquid separation to produce low-purity lithium phosphate precipitated in a solid phase, (k) adding water of 10 parts by weight to the low-purity lithium phosphate and adding acid to produce a matured lithium phosphate liquid having a pH value of 10, (l) maturing the lithium phosphate by agitating the matured lithium phosphate liquid at room temperature for 30 minutes or longer, (m) adding a lithium hydroxide aqueous solution to the matured lithium phosphate liquid at a weight equivalent to a dosage of the acid to produce a lithium phosphate precipitation solution having a pH value of 13, and (n) agitating the lithium phosphate precipitation solution at a temperature of 70° C. for 60 minutes or longer to obtain high-purity lithium phosphate, and the second process includes steps of (o) mixing the high-purity lithium phosphate with a sulfuric acid aqueous solution to produce a liquid mixture of lithium phosphate and sulfuric acid, (p) condensing the liquid mixture of lithium phosphate and sulfuric acid and performing solid-liquid separation to obtain high-purity lithium sulfate having a solid phase, (q) dissolving the high-purity lithium sulfate in water or a sodium hydroxide aqueous solution, depositing remaining phosphoric acid as lithium phosphate while maintaining a pH value of the lithium sulfate aqueous solution at 12 or higher, and performing solid-liquid separation to obtain a lithium sulfate aqueous solution, and (r) depositing lithium carbonate by adding carbonate, a carbonate aqueous solution, or a carbonic acid gas to the lithium sulfate aqueous solution and performing solid-liquid separation to obtain low-purity crude lithium carbonate having a solid-phase polycrystalline state and a particle size of 20 to 200 μm.

4. The method according to claim 3, wherein the reaction for depositing the remaining phosphoric acid as lithium phosphate in the step (q) is performed at a temperature of 50 to 90° C. for 20 to 120 minutes by setting a concentration of the lithium sulfate aqueous solution to 0.3 M to 2.4 M.

5. The method according to claim 3, wherein the deposition reaction of the lithium carbonate in the step (r) is performed at a temperature of 30° C. or higher for 20 minutes to 2 hours by setting a concentration of the lithium sulfate of the lithium sulfate aqueous solution to 0.3 M to 2.4 M and adding sodium carbonate or sodium hydroxide and a carbonic acid gas at one equivalent weight of the lithium sulfate.

6. The method according to claim 1, wherein the crude lithium carbonate slurry of the step (a) is produced by mixing water of 5 to 20 parts by weight to crude lithium carbonate of 1 parts by weight.

7. The method according to claim 1, wherein the carbonation of the crude lithium carbonate slurry in the step (b) is performed by supplying a carbonic acid gas to crude lithium carbonate slurry of 1 liter at a flow rate of 500 ml/min for 0.5 to 1.5 hours.

8. The method according to claim 1, wherein the soluble barium salts of the step (d) has an aqueous solution state in which a mixture containing at least one selected from the group consisting of barium nitrate, barium chloride, barium hydroxide, and barium sulfate is dissolved at a mole concentration of 0.1 to 1, and the soluble barium salts are added at 0.9 to 1 molar equivalent to one molar equivalent of sulfuric acid ions contained in the filtrate.

9. The method according to claim 1, wherein the precipitation of the lithium carbonate in the step (f) is performed by adding 5 to 50 g of lithium carbonate seed crystals having a size of 2 to 5 μm to 1 liter of the filtrate obtained from the secondary solid-liquid separation, and generating the reaction under a decompressed environment equal to or lower than 1 bar at a temperature of 50 to 100° C. with an agitation rate of 50 to 400 rpm.

10. The method according to claim 1, wherein the lithium carbonate precipitation of the step (f) is performed by adding 5 to 50 g of lithium carbonate seed crystals having a particle size of 2 to 5 μm to 1 liter of the filtrate obtained from the secondary solid-liquid separation, and generating the reaction at room temperature by adding a lithium hydroxide aqueous solution of 0.2 to 2 mole concentration at the same molar equivalent as that of the lithium ions contained in the filtrate.

11. The method according to claim 1, wherein carbon dioxide ($CO_2$) generated from precipitation of lithium carbonate in the step (f) is recovered and is recycled to the carbonating of the crude lithium carbonate slurry in step (b).

12. The method according to claim 3, wherein the soluble phosphate of step (i) comprises one or more selected from the group consisting of $Na_3PO_4$, $Na_2HPO_4$, $NaH_2PO_4$, $K_3PO_4$, $H_3PO_4$, and an aqueous solution thereof.

13. The method according to claim 3, wherein the soluble acid of step (k) comprises one or more selected from the group consisting of $H_3PO_4$, $H_2CO_3$, $H_2SO_4$, $HNO_3$, HCl, and an aqueous solution thereof.

* * * * *